(12) United States Patent
Zhang et al.

(10) Patent No.: US 8,229,178 B2
(45) Date of Patent: Jul. 24, 2012

(54) METHOD AND APPARATUS FOR PERSONAL IDENTIFICATION USING PALMPRINT AND PALM VEIN

(75) Inventors: David Zhang, Hong Kong (HK); Guangming Lu, Hong Kong (HK); Zhenhua Guo, Hong Kong (HK); Nan Luo, Hong Kong (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 421 days.

(21) Appl. No.: 12/542,715

(22) Filed: Aug. 18, 2009

(65) Prior Publication Data

US 2010/0045788 A1 Feb. 25, 2010

Related U.S. Application Data

(60) Provisional application No. 61/089,906, filed on Aug. 19, 2008.

(51) Int. Cl.
*G06K 9/00* (2006.01)
(52) U.S. Cl. .......................... 382/115; 348/77; 382/124
(58) Field of Classification Search ................. 348/77, 348/78; 382/115, 107, 124
See application file for complete search history.

(56) References Cited

U.S. PATENT DOCUMENTS

| | | | |
|---|---|---|---|
| 3,581,282 A | 5/1971 | Altman | |
| 4,032,889 A | 6/1977 | Nassimbene | |
| 7,526,110 B2 | 4/2009 | Niinuma et al. | |
| 8,111,878 B2 * | 2/2012 | Sato | 382/115 |
| 2007/0003112 A1 | 1/2007 | Awatsu et al. | |
| 2007/0092112 A1 * | 4/2007 | Awatsu et al. | 382/115 |
| 2007/0201727 A1 * | 8/2007 | Birrell et al. | 382/115 |
| 2008/0005578 A1 * | 1/2008 | Shafir | 713/186 |
| 2008/0192988 A1 * | 8/2008 | Uludag et al. | 382/115 |
| 2009/0214083 A1 * | 8/2009 | Sato | 382/124 |
| 2010/0030696 A1 * | 2/2010 | Naccache | 705/71 |
| 2010/0239129 A1 * | 9/2010 | Abe | 382/115 |
| 2011/0200237 A1 * | 8/2011 | Nakamura et al. | 382/124 |

OTHER PUBLICATIONS

J. Wang, W. Yau, A. Suwandy, and E. Sung, "Person recognition by fusing palmprint and palm vein images based on "Laplacianpalm" representation", Pattern Recognition 41(5), pp. 1531-1544, 2008.
A. W. K. Kong, and D. Zhang, "Competitive coding scheme for palmprint verification", Proc. 17th ICPR, Washington, DC, vol. 1, pp. 1051-4651, 2005.
Y.-B. Zhang, Q. Li, J. You and P. Bhattacharya, "Palm vein extraction and matching for personal authentication", Proc. 9th Intl. Conference VISUAL, pp. 154-164, 2007.

* cited by examiner

*Primary Examiner* — Ramy M Osman
(74) *Attorney, Agent, or Firm* — The Hong Kong Polytechnic University

(57) ABSTRACT

A method of personal identification includes switching between visible and near infrared light, acquiring palmprint image and palm vein image from a person under the visible and the near infrared light, extracting sub-images from the palmprint image and the palm vein image based on a region of interest, extracting multiple features from the sub-images, and matching the extracted multiple features with stored information in a database to authenticate the person.

8 Claims, 5 Drawing Sheets

METHOD AND APPARATUS FOR PERSONAL IDENTIFICATION USING PALMPRINT AND PALM VEIN

CROSS REFERENCE TO RELATED APPLICATION

The present application claims priority from U.S. Provisional Patent Application No. 61/089,906 filed on Aug. 19, 2008, which is hereby incorporated by reference herein in its entirety.

BACKGROUND OF THE INVENTION

1. Field of the Invention

The present invention relates to personal identification, more particularly, to personal identification using biometric information such as palmprint and palm vein.

2. Description of the Related Art

Reliability in the personal authentication is key to the security in the networked society. Many physiological characteristics of humans, i.e. biometrics, are typically time invariant, easy to acquire, and unique for every individual. Biometric features such as face, iris, fingerprint, hand geometry, palmprint, signature, etc., have been suggested for the security in access control. Most of the current research in biometrics has been focused on fingerprint and facial recognition. The reliability of personal identification using facial image is currently low as the researchers today continue to grapple with the problems of pose, lighting, orientation and gesture. Fingerprint identification is widely used in personal identification as it works well in most cases. However, it is difficult to acquire fingerprint features i.e. minutiae, for some people such as manual laborers, elderly people, etc. As a result, other biometric characteristics are receiving increasing attention. The hand based biometric techniques, i.e., fingerprint and hand geometry, are most attractive in the market because of high user-acceptance.

Prior researchers have attempted to devise personal authentication systems using various biometric traits. Some researchers have also suggested the hand based measurements for the personal authentication. The US patent office has issued few patents for the devices that range from electromechanical devices to the image scanners and used for personal authentication. The U.S. Pat. No. 4,736,203 issued in 1988 details an electronic hand scanning device for personal identification. Prior to this two U.S. Pat. Nos. 3,576,537 and 3,576,538 were issued for personal authentication systems that were based on hand geometry based measurements.

The recent U.S. patent application Ser. No. 11/347,411 details a device which is tailored for the acquisition of palm vein information. Wang et al. (Person recognition by fusing palmprint and palm vein images based on "Laplacianpalm" representation, *Pattern Recognition* 41(5), pp. 1531-1544, 2008) proposed to fuse palmprint and palm vein images for person recognition. Because palmprint and palm vein images contain complementary information, the experiments showed significant improvement by fusing. However, their system was composed of two separated cameras and required a time-cost registration procedure which made it difficult to apply for real-time application. Another U.S. patent application Ser. No. 11/084,168 details the use of two-stage minutiae matching approach for personal authentication. The first commercial palmprint identification system was developed in 1971 which was followed by another system from IBM in 1977.

SUMMARY OF THE INVENTION

According to an aspect of the present invention, a method of personal identification includes switching between visible and near infrared light, acquiring palmprint image and palm vein image from a person under the visible and the near infrared light, extracting sub-images from the palmprint image and the palm vein image based on a region of interest, extracting multiple features from the sub-images, and matching the extracted multiple features with stored information in a database to authenticate the person.

According to another aspect of the present invention, a personal identification system includes a light controller configured to control a lighting unit to switch between visible and near infrared light, an image capture apparatus configured to acquire palmprint image and palm vein image from a person under the visible and the near infrared light, and a computer configured to, extract sub-images from the palmprint image and the palm vein image based on a region of interest, extract multiple features from the sub-images, and match the extracted multiple features with stored information in a database to authenticate the person.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The accompanying drawings, which are incorporated in and constitute a part of the specification, illustrate embodiments of the invention and, together with the description, serve to explain the principles of the invention.

Firstly, according to one embodiment of the present invention, a standalone system that collects palmprint and palm vein features has been build for the personal identification. The art of employing multiple features has been developed in this invention. Secondly, the present invention employs a multilevel framework for personal authentication that efficiently combines different palm features. The invention demonstrates that the combination of palmprint and palm vein information, using the proposed multilevel matcher, results in significant performance improvement over the case when one modal is employed alone. Finally, our invention is significantly effective against spoof attacks (present a fake biometric to the acquisition device) on traditional palmprint image based system.

The extraction of palmprint and palm vein information in the present invention is fully automated and simultaneous. Unlike other multibiometrics systems (e.g., face and fingerprint, voice and face, etc.), a user does not have to undergo the inconvenience of passing through multiple sensors. Another feature of the present invention is the achievement of high performance and security in personal identification that cannot be achieved with any of the currently available palmprint based online systems.

Figure 1:
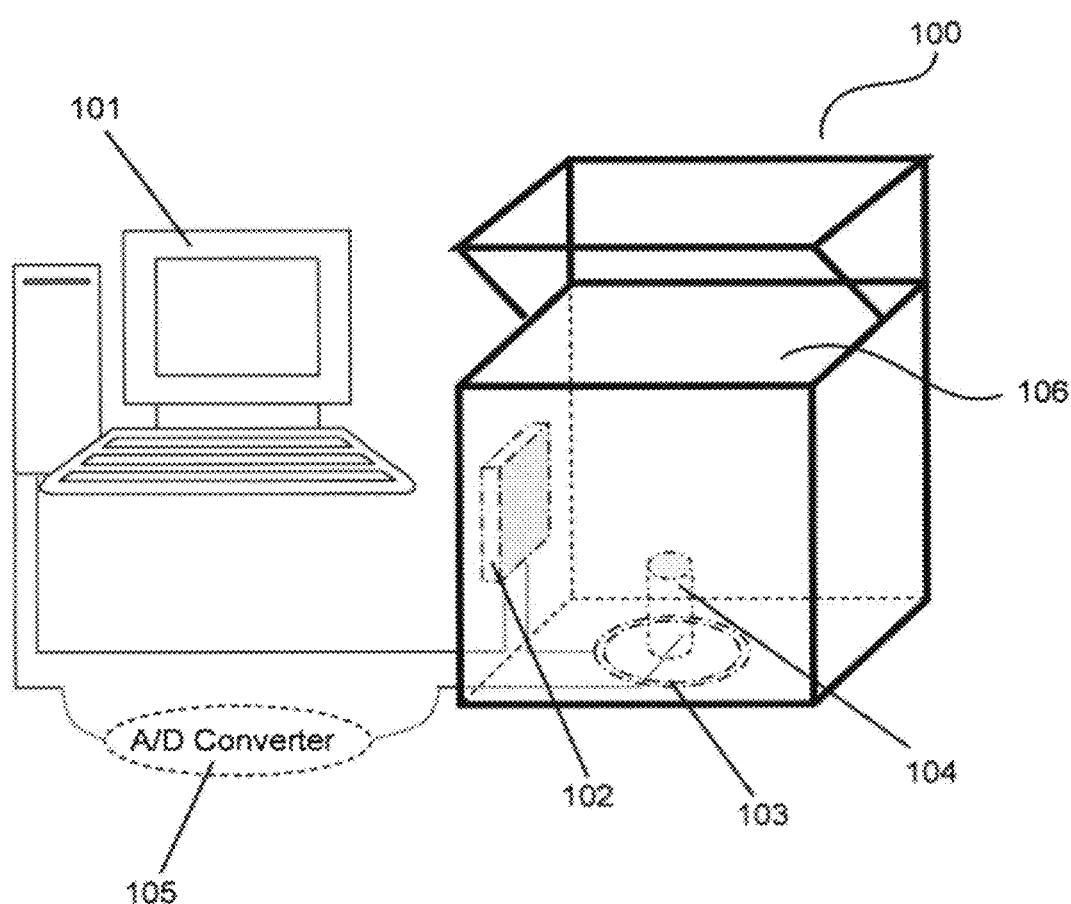
FIG. 1 is an exemplary configuration of an image capture device.
Figure 2A:
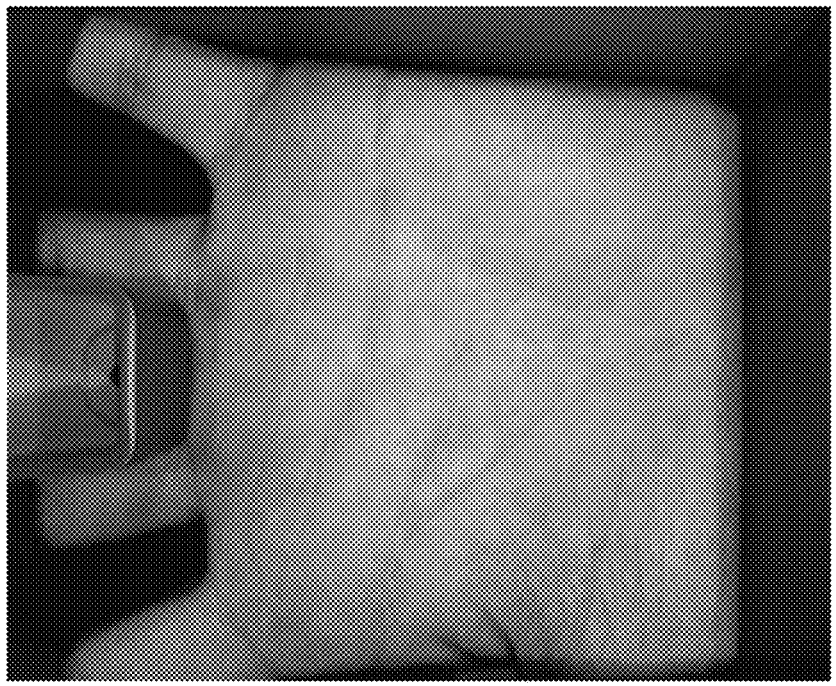
FIGS. 2A and 2B are examples of a palmprint image and a palm vein image captured from the same palm.
Figure 2B:
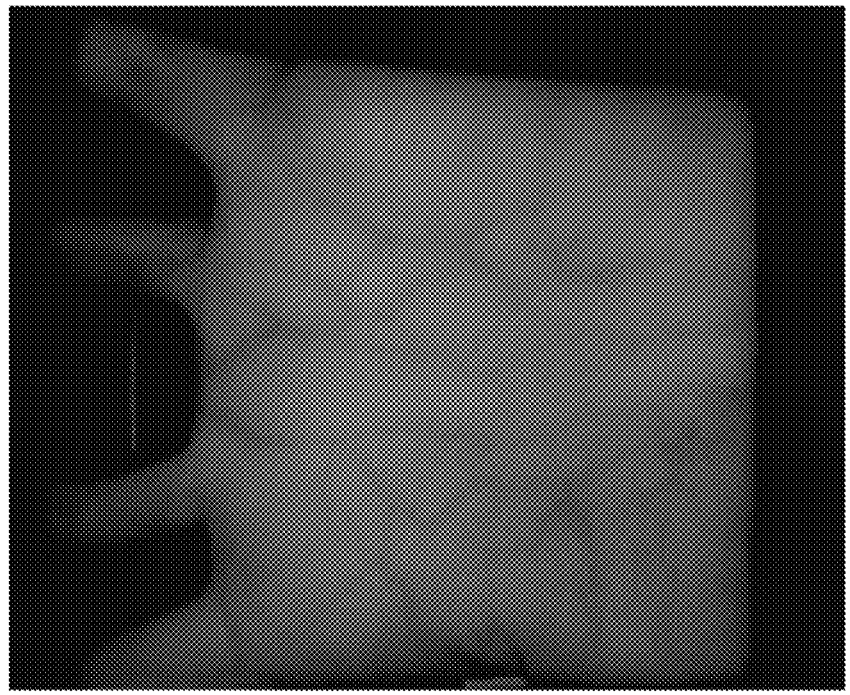

The image acquisition device according to an embodiment of the present invention is shown in FIG. 1. An image capture device such as charge-coupled device (CCD) camera 104 is used to capture the images formed on the object. Infrared sensors (not shown) are employed to detect the presence of the hand on the acquisition device 106. When a hand is detected, the image acquisition device 100 will startup the light controller 102, the lighting unit 103 are switched between visible and near infrared. One palmprint and palm vein image under different lights are collected and transferred to computer 101 via A/D converter 105. FIGS. 2A and 2B show acquisition of sample hand images using the image acquisition device 100. FIG. 2A illustrates an example of a palmprint image and FIG. 2B illustrates an example of a palm vein image.

Each of the acquired images (FIGS. 2A and 2B) is processed to automatically extract the reliable region of interest (ROI). This approach is to establish a coordinate system with the gaps between the fingers as reference points and extracts a sub-image of fixed size located at the central part of the palmprint and palm vein.

Figure 3A:
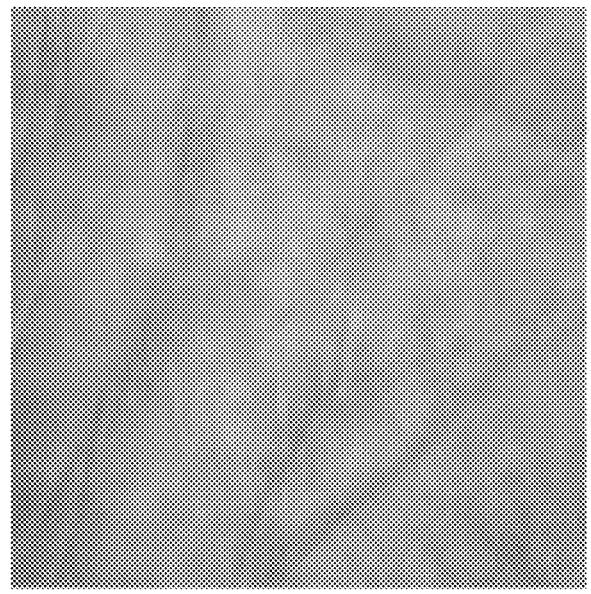
FIGS. 3A and 3B are examples of a palmprint sub-image and a palm vein sub-image.
Figure 3B:
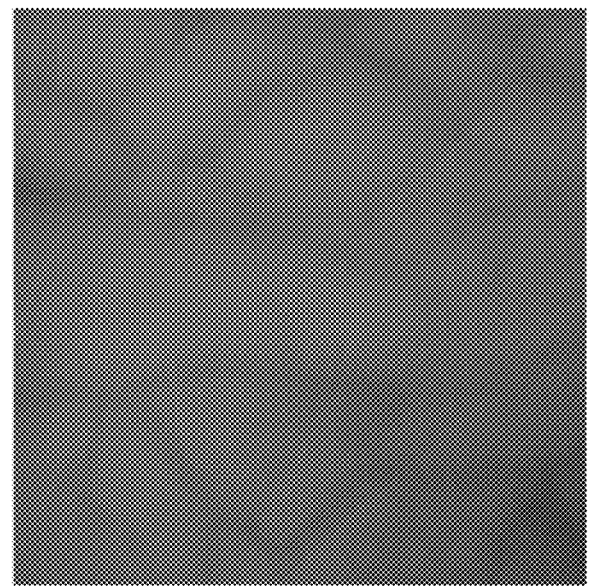

FIGS. 3A and 3B illustrate examples of sub-images acquired from the palmprint image and the palm vein image. These sub-images are further processed to extract palmprint and palm vein features respectively. Similarity between the palmprint and palm vein features of the same modal is computed. The multiple scores computed from multi-modal are multiplied as a final matching score. On the other hand, if the palm vein image fails to pass the liveness detection, the palm will be regarded as a fake palm.

Extraction of Palmprint Feature

As a state-of-the-art algorithm for palmprint verification, orientation-based coding could achieve very good performance within a short matching time. Taking palm lines as negative lines, Kong et al., ("Competitive coding scheme for palmprint verification", *Proc. 17th ICPR*, Washington, D.C., vol. 1, pp. 1051-4651, 2005), firstly attempted to utilize orientation of palm lines for palmprint verification. CompCode proposed to use six real part of the neurophysiology-based Gabor filters $\psi_\theta$, which is defined as:

$$\psi(x, y, \omega, \theta) = \frac{\omega}{\sqrt{2\pi}\kappa} e^{-\frac{\omega^2}{8\kappa^2}(4x'^2+y'^2)}\left(\cos(\omega x') - e^{-\frac{\kappa^2}{2}}\right) \quad (1)$$

where $x'=(x-x_0)\cos\theta+(y-y_0)\sin\theta$, $y'=-(x-x_0)\sin\theta+(y-y_0)\cos\theta$, $(x_0, y_0)$ is the center of the function; $\omega$ is the radial frequency in radians per unit length and $\theta$ is the orientation of the Gabor functions in radians. The $\kappa$ is defined by $$\kappa = \sqrt{2\ln 2}\left(\frac{2^\delta+1}{2^\delta-1}\right),$$

where $\delta$ is the half-amplitude bandwidth of the frequency response. To reduce the influence of illumination, DC (direct current) is removed in filter design. For each pixel, six different filters, $\theta_j = j\pi/6$, where $j=\{0, 1, 2, 3, 4, 5\}$ are chosen. Then, according to palm lines' property, CompCode selected $I_{CompCode}=\arg\min_j(I(x,y)*\psi_R(x,y,\omega,\theta))$ as the orientation for the position of (x,y), where I is an image.

Matching Features for Palmprint

The extracted palmprint features are compared with palmprint features stored in the database to obtain the palmprint matching distance. Angular distances are employed to compare the features extracted from palmprint representations. Let P and Q be the two feature matrices (competitive codes) and $P_M$ and $Q_M$ be the corresponding masks used for indicating the non palmprint pixels. Angular distance D(P,Q) is defined by the following equation:

$$D(P, Q) = \frac{\sum_{y=0}^{N}\sum_{x=0}^{N}\sum_{i=0}^{3}(P_M(x, y) \cap Q_M(x, y)) \cap (P_i^b(x, y) \otimes Q_i^b(x, y))}{3\sum_{y=0}^{N}\sum_{x=0}^{N} P_M(x, y) \cap Q_M(x, y)} \quad (2)$$

where $\cap$ and $\otimes$ denote the bitwise AND and XOR operations respectively. $P_i^b(Q_i^b)$ is the ith bit plane of P(Q). Taking into account the possible translations in the extracted sub-image (with respect to the one extracted during the enrolment), multiple matchings are performed with one of the features translated in horizontal and vertical directions. The minimum of the resulting matching scores is considered to be the palmprint matching score.

Extraction of Palm Vein

Through observing the cross-sections of palm veins, we found their shape is similar to Gaussian. Based on this observation, matched filter can be a good technique to extract these palm veins. The matched filter is designed as Gaussian filter along angle $\theta$, it is defined as:

$$g_\theta^\sigma(x, y) = -\exp\left(-\frac{(x\cos\theta + y\sin\theta)^2}{2\sigma^2}\right) - m \quad (3)$$

where m is the mean value of the filter, $\sigma$ is the standard deviation of Gaussian. In order to suppress the background pixels, the filter is designed as a zero-sum. For one $\sigma$, four different angle filters ($\theta_j=j\pi/4$, where $j=\{0, 1, 2, 3\}$) are applied for each pixel, and the maximal response among four are kept as the final response at the pixel.

Product of different filter is a good way to keep edge structure and decrease noise. The product of filter response is defined as:

$$P(x,y)=R_g^{\sigma_1}(x,y)*R_g^{\sigma_2}(x,y) \quad (4)$$

$$R_g^\sigma(x,y)=g_\theta^\sigma(x,y)*f(x,y) \quad (5)$$

After getting the production of different filters, the response is binarized, vein is represented by "1" and background is represented by "0". Finally, post-processing technique is applied to remove some small regions.

Matching Features for Palm Vein

The extracted palm vein features are compared with palm vein features stored in the database to obtain the palm vein matching distance. The distance between two palm veins is computed as:

$$D(P, Q) = 1 - \frac{\sum_{y=0}^{M} \sum_{x=0}^{N} (P^b(x, y) \& Q^b(x, y))}{\sum_{y=0}^{M} \sum_{x=0}^{N} (P^b(x, y) \mid Q^b(x, y))} \quad (6)$$

where P and Q are two palm vein features. "&" is bitwise AND and "|" is bitwise OR.

Similar as palmprint, we translate one of the features vertically and horizontally in a range and match it with the other feature. A minimal distance obtained by translated matching is regarded as the final distance. The minimum of the resulting matching scores is considered to be the palm vein matching score.

Experiments and Results

In order to evaluate the present invention, rigorous experiments were initially performed on the specially acquired palmprint and palm vein image database from the 250 subjects. This database was collected at the Biometric Research Centre, the Hong Kong Polytechnic University over a period of three weeks. The database was collected in two sessions, with an interval of two weeks and mainly consisted of volunteers and students from our university and Harbin Institute of Technology. However, the utility of our approach is not only limited to the performance improvement. The database for the experimental results reported in this section includes only real palmprint images. All images were acquired using the capture device shown in FIG. 1. For each subject, six samples of palmprint and palm vein images were captured and stored in the database. Thus, there are a total of 250*2*6*2=2000 palmprint and palm vein images in our database. To obtain the verification accuracy from our invention, each palmprint image is matched with all other palmprint images in the database, resulting in 33,000 genuine and 17,964,000 impostors matching scores for each of the two modalities. The Equal Error Rate (EER) for palmprint and palm vein is 0.0352%, and 0.3091% respectively.

Figure 4:
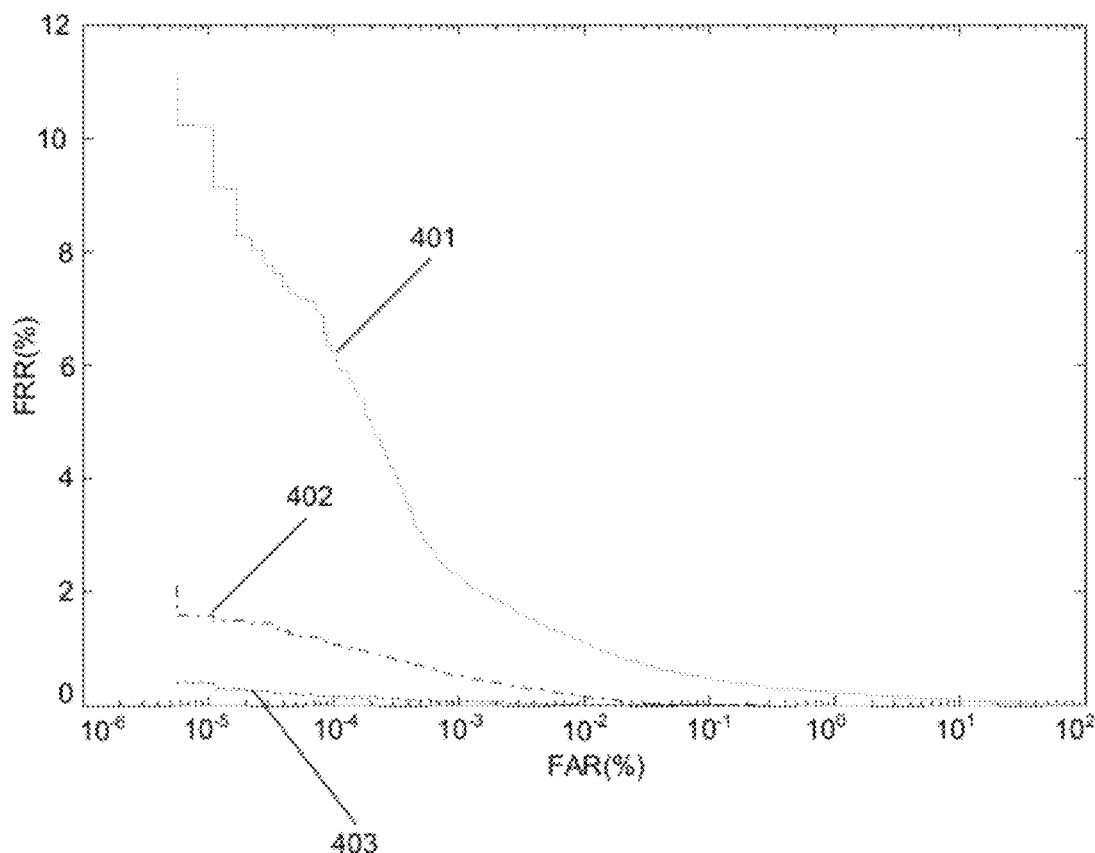
FIG. 4. is a ROC curves of palmprint, palm vein and fusion of palmprint and palm vein.

Experiments based on product rule are employed. FIG. 4 illustrates the Receiver Operating Characteristics (ROC) curves for palm vein 401, palmprint 402, and the fusion of palm vein and palmprint 403. In FIG. 4, FRR (%) and FAR (%) represent "False Rejection Rate" and "False Acceptance Rate" respectively. It can be observed that the performance is significantly higher as compared with each modal, the EER of fusion is only 0.0151%.

Evaluation Against Spoof Attacks

Figure 5:
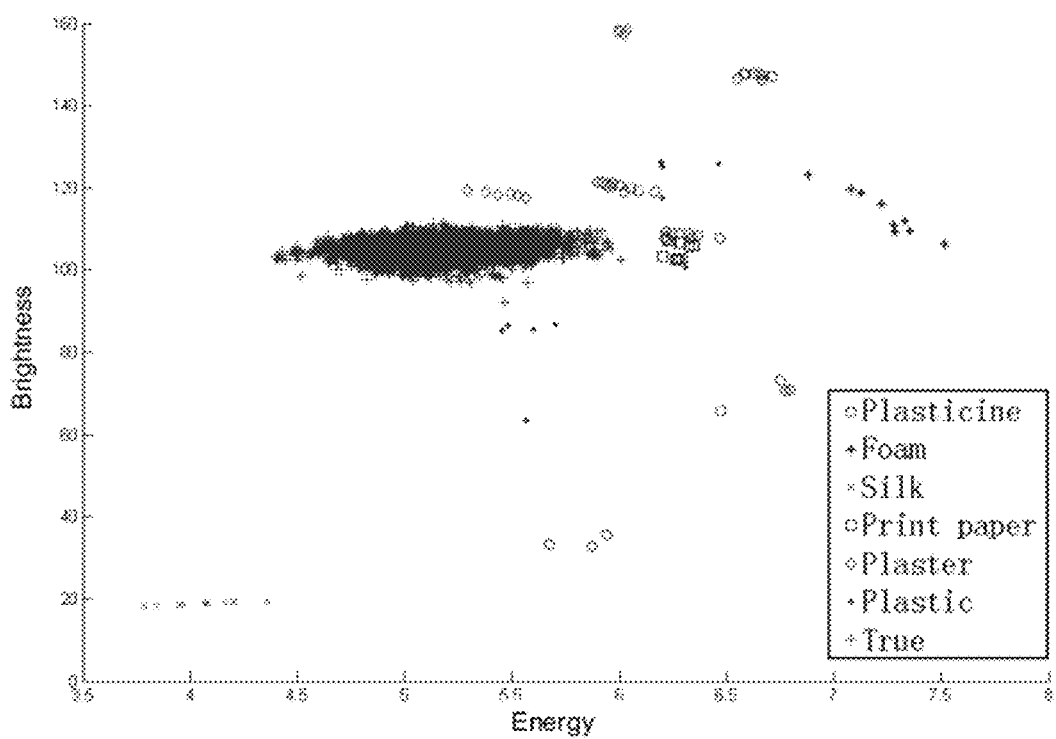
FIG. 5 is an exemplary brightness and GLCM energy distribution of fake and true palm under near infrared illumination.

Biometrics can improve security, but biometric system is vulnerable to spoof attack. Thus, the present invention includes a liveness detection based on an acquired image. Because human skin possess special reflectance and absorbance properties under near infrared spectral, and these properties can be reflected from the image brightness and texture. So, the present invention includes a liveness detection algorithm for distinguishing the skin from non-skin material based on image brightness and texture information. A fake palm database was built which include 96 images, by six different materials: plasticine, foam, silk, print paper, plaster and plastic. The distribution of brightness and energy is shown in FIG. 5. Because the skin reflectance and absorbance are different from those six materials, there is a clear boundary between them. And in most cases, different material is clustered in a region as different material has specific property under near Infrared illumination. Here, the brightness feature is computed as:

$$B = \frac{1}{M*N} \sum_{x=1}^{M} \sum_{y=1}^{N} f(x, y) \quad (7)$$

where f(x, y) represents the gray value in pixel (x, y).

Texture information can be obtained by Gray Level Co-occurrence Matrix (GLCM), which is a widely used texture operator in image processing and pattern recognition field. For a given angle $\theta$ and distance d, a GLCM is defined as:

$$p_{\theta,d}(i, j) = \frac{\#\{[(x_1, y_1), (x_2, y_2)] \in S \mid f(x_1, y_1) = i \, \& \, f(x_2, y_2) = j\}}{\#S} \quad (8)$$

where S is the set of pixels in the image and # is the number operator. (i, j) is the coordinate in the GLCM.

After getting GLCM, several statistics can be derived, such as entropy, contrast, correlation, energy, homogeneity, etc. Among them, energy is a popular feature to represent the uniformity of image texture: more uniform texture, bigger energy. Here the energy is defined as:

$$E = \sum_i \sum_j p(i, j)^2 \quad (9)$$

The present invention may also be realized by supplying a system or an apparatus with a storage medium in which a program code of software which realizes the functions of the above described embodiments is stored, and causing a computer of the system or apparatus to read out and execute the program code stored in the storage medium.

In this case, the program code itself read from the storage medium realizes the functions of either of the above described embodiments, and hence the program code and the storage medium in which the program code is stored constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A method of personal identification, the method comprising:
    switching between visible and near infrared light;
    acquiring palmprint image and palm vein image from a person under the visible and the near infrared light;
    extracting a palmprint sub-image from the palmprint image, and a palm vein sub-image from the palm vein image, the palmprint sub-image and the palm vein sub-image are based on a common region of interest;
    extracting palmprint features from the palmprint sub-image, and extracting palm vein features from the palm vein sub-image using a matched filter technique; and
    matching the extracted palmprint features and palm vein features with stored information in a database to authenticate the person.

2. The method according to claim 1, further comprises determining whether the palmprint image or the palm vein image is non-skin material based on image brightness information and texture information, and rejecting a person if the palmprint image or the palm vein image is determined as non-skin material.

3. The method according to claim 1, wherein the person is authenticated based on a result of a matching score.

4. The method according to claim 3, wherein the final matching score is a product of a palmprint matching score and a palm vein matching score.

5. A personal identification system comprising:
- a light controller configured to control a lighting unit to switch between visible and near infrared light;
- an image capture apparatus configured to acquire palmprint image and palm vein image from a person under the visible and the near infrared light; and
- a computer configured to:
    - extract a palmprint sub-image from the palmprint image and a palm vein sub-image from the palm vein image, the palmprint sub-image and the palm vein sub-image are based on a common region of interest;
    - extract palmprint features from palmprint sub-image, and to extract palm vein features from the palm vein sub-image using a matched filter technique; and
    - match the extracted palmprint features and palm vein features with stored information in a database to authenticate the person.

6. The personal identification system according to claim 5, wherein the computer is configured to determine whether the palmprint image or the palm vein image is non-skin material based on image brightness information and texture information, and rejecting a person if the palmprint image or the palm vein image is determined as non-skin material.

7. The personal identification system according to claim 5, wherein the person is authenticated based on a result of a final matching score.

8. The personal identification system according to claim 7, wherein the final matching score is a product of a palmprint matching score and a palm vein matching score.

* * * * *